United States Patent
He

(10) Patent No.: US 9,705,960 B2
(45) Date of Patent: *Jul. 11, 2017

(54) METHOD, DEVICE, AND SYSTEM FOR ACQUIRING A WEB PAGE

(71) Applicant: Alibaba Group Holding Limited, George Town (KY)

(72) Inventor: Ling He, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/827,217

(22) Filed: Aug. 14, 2015

(65) Prior Publication Data

US 2016/0050252 A1 Feb. 18, 2016

Related U.S. Application Data

(63) Continuation of application No. 14/486,552, filed on Sep. 15, 2014, now Pat. No. 9,143,551, which is a (Continued)

(30) Foreign Application Priority Data

Sep. 4, 2008 (CN) .......................... 2008 1 0215530

(51) Int. Cl.
  *G06F 15/16* (2006.01)
  *H04L 29/08* (2006.01)
  (Continued)

(52) U.S. Cl.
  CPC ........ *H04L 67/02* (2013.01); *G06F 17/30902* (2013.01); *H04L 67/06* (2013.01);
  (Continued)

(58) Field of Classification Search
  CPC .......................... H04L 67/02; G06F 17/30902
  (Continued)

(56) References Cited

U.S. PATENT DOCUMENTS 5,862,347 A 1/1999 Suzuki et al.
5,894,554 A 4/1999 Lowery et al.
(Continued)

FOREIGN PATENT DOCUMENTS

CN 101140574 A 3/2008
CN 101201827 A 6/2008
(Continued)

OTHER PUBLICATIONS

Smith (Garvin Smith, "Windows 2000 Performance Guide", 2002, O'Reilly & associates inc., chapter 6).*
(Continued)

*Primary Examiner* — Dustin Nguyen
*Assistant Examiner* — Joel Mesa
(74) *Attorney, Agent, or Firm* — Van Pelt, Yi & James LLP

(57) ABSTRACT

A technique for acquiring a web page includes: receiving, at a client, a user instruction; obtaining from the instruction a page number of a web page that a user desires to access; searching for web page data in a hidden form that is cached in advance at the client, the search being based at least in part on the page number and the hidden form comprising web page data for a plurality of page numbers and in the event that web page data is found in the hidden form, generating, by the client, the web page using the web page data.

20 Claims, 6 Drawing Sheets

Related U.S. Application Data continuation of application No. 13/915,503, filed on Jun. 11, 2013, now Pat. No. 8,914,440, which is a continuation of application No. 12/583,718, filed on Aug. 24, 2009, now Pat. No. 8,499,033.

(51) Int. Cl.
*G06F 17/30* (2006.01)
*H04L 29/06* (2006.01)

(52) U.S. Cl.
CPC .......... *H04L 67/2842* (2013.01); *H04L 67/42* (2013.01); *H04L 29/08072* (2013.01)

(58) Field of Classification Search
USPC .................................................. 709/203, 201
See application file for complete search history.

(56) References Cited

U.S. PATENT DOCUMENTS

| | | |
|---|---|---|
| 6,026,474 A | 2/2000 | Carter et al. |
| 6,128,655 A | 10/2000 | Fields et al. |
| 6,192,398 B1 | 2/2001 | Hunt |
| 6,253,234 B1 | 6/2001 | Hunt et al. |
| 6,311,197 B2 | 10/2001 | Mighdoll et al. |
| 6,415,335 B1 | 7/2002 | Lowery et al. |
| 6,438,125 B1 | 8/2002 | Brothers |
| 6,510,458 B1 | 1/2003 | Berstis et al. |
| 6,763,248 B1 | 7/2004 | Odamura |
| 7,194,473 B1 | 3/2007 | Hichwa et al. |
| 2002/0091788 A1* | 7/2002 | Chlan ............... H04L 67/42 709/213 |
| 2003/0074425 A1* | 4/2003 | Kawakita .......... G06F 17/30873 709/219 |
| 2005/0132020 A1 | 6/2005 | Gorbet et al. |
| 2005/0229239 A1 | 10/2005 | Gray et al. |
| 2006/0136593 A1 | 6/2006 | Silky et al. |
| 2007/0112837 A1* | 5/2007 | Houh ............... G06F 17/30247 |

FOREIGN PATENT DOCUMENTS

| | | |
|---|---|---|
| JP | 2001154903 A | 6/2001 |
| JP | 2005010828 A | 1/2005 |

OTHER PUBLICATIONS

Rusling (David A Rusling, "The Linux Kernel", 1996-1999, http://tldp.org/ LDP/ tlk/ mm/ memory.htlm.).*

Rusling (David A Rusling, "The Linux Kernel", 1996-1999, http://tldp.org/LDP/tlk/mm/memory.htlm.).

* cited by examiner

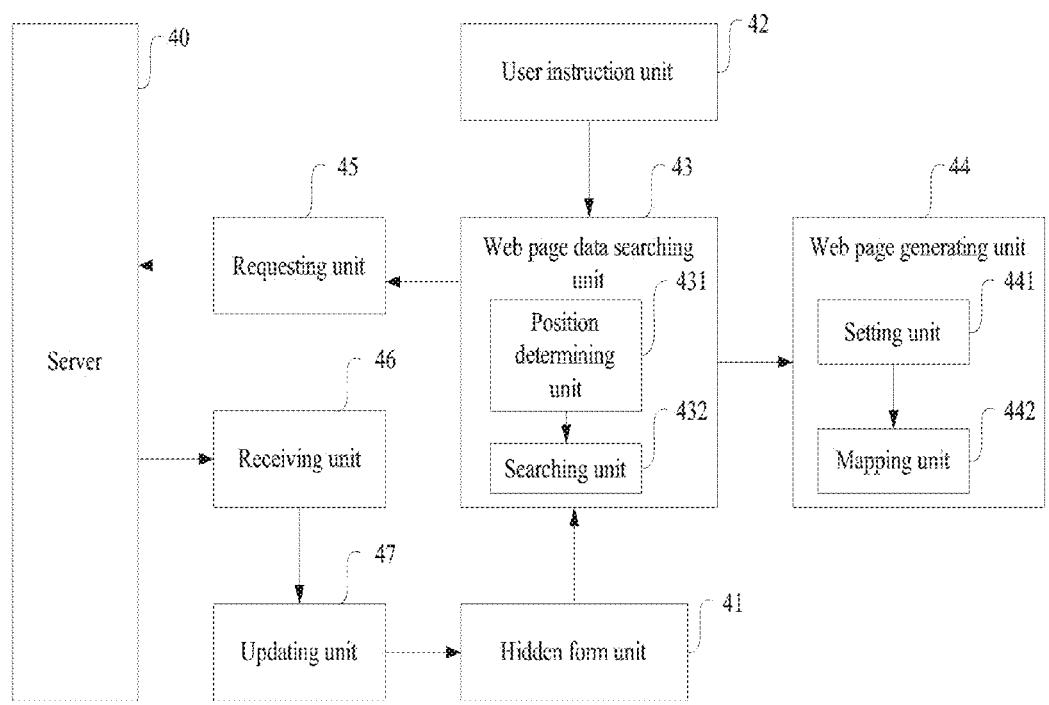

METHOD, DEVICE, AND SYSTEM FOR ACQUIRING A WEB PAGE

CROSS REFERENCE TO OTHER APPLICATIONS

This application is a continuation of co-pending U.S. patent application Ser. No. 14/486,552, entitled METHOD, DEVICE, AND SYSTEM FOR ACQUIRING A WEB PAGE filed Sep. 15, 2014 which is incorporated herein by reference for all purposes, which is a continuation of U.S. patent application Ser. No. 13/915,503, now U.S. Pat. No. 8,914,440, entitled METHOD, DEVICE, AND SYSTEM FOR ACQUIRING A WEB PAGE filed Jun. 11, 2013 which is incorporated herein by reference for all purposes, which is a continuation of U.S. patent application Ser. No. 12/583, 718, now U.S. Pat. No. 8,499,033, entitled METHOD, DEVICE, AND SYSTEM FOR ACQUIRING A WEB PAGE filed Aug. 24, 2009 which is incorporated herein by reference for all purposes, which claims priority to People's Republic of China Patent Application No. 200810215530.2 entitled METHOD, DEVICE, AND SYSTEM FOR ACQUIRING WEB PAGE filed Sep. 4, 2008 which is incorporated herein by reference for all purposes.

FIELD OF THE INVENTION

The present invention relates to the field of network technologies and particularly to a method, device and system for acquiring a web page.

BACKGROUND OF THE INVENTION

When a user accesses a web page via a web client such as the browser, often a number of web pages are required for the display of the contents of the web page being accessed. Presently, there are a few solutions for acquiring and displaying web page data of each web page at the client.

In one solution, a web page accessing request is sent from a client to a server. Upon receiving the request, the server searches a database at a time for all data related to the content to be accessed by a user and performs the pagination of web pages within its memory. Subsequently, according to the page number of the web page that the user desires to access and sent from the client every time, the server provides the user with the web page corresponding to the page number via the client. In this solution, a large amount of memory in the server is occupied if the amount of data of paginated web pages is large, thus lowering the efficiency of the server.

In another solution, a web page accessing request is sent from a client to a server. Upon receiving the request, the server calculates, according to the page number of the web page that the user desires to access, a starting position and an ending position of web page data corresponding to the page number in a database, searches the database for the data between the starting position and the ending position to generate the web page that the user desires to access, and outputs the web page to the user via the client. In this solution, the server searches the database upon each page switching request from the user. Thus, if a large number of users make requests to access web pages simultaneously, the excessively frequent searching in the database by the server can easily lead to an Input/Output (IO) bottleneck in the database.

BRIEF DESCRIPTION OF THE DRAWINGS

Various embodiments of the invention are disclosed in the following detailed description and the accompanying drawings.

FIG. 3 is a diagram showing web page numbers which are displayed on a web page and provided for user selection according to an embodiment of the present invention.

FIG. 4 is a block diagram showing a client system according to an embodiment of the present invention.

DETAILED DESCRIPTION

Figure 1A:
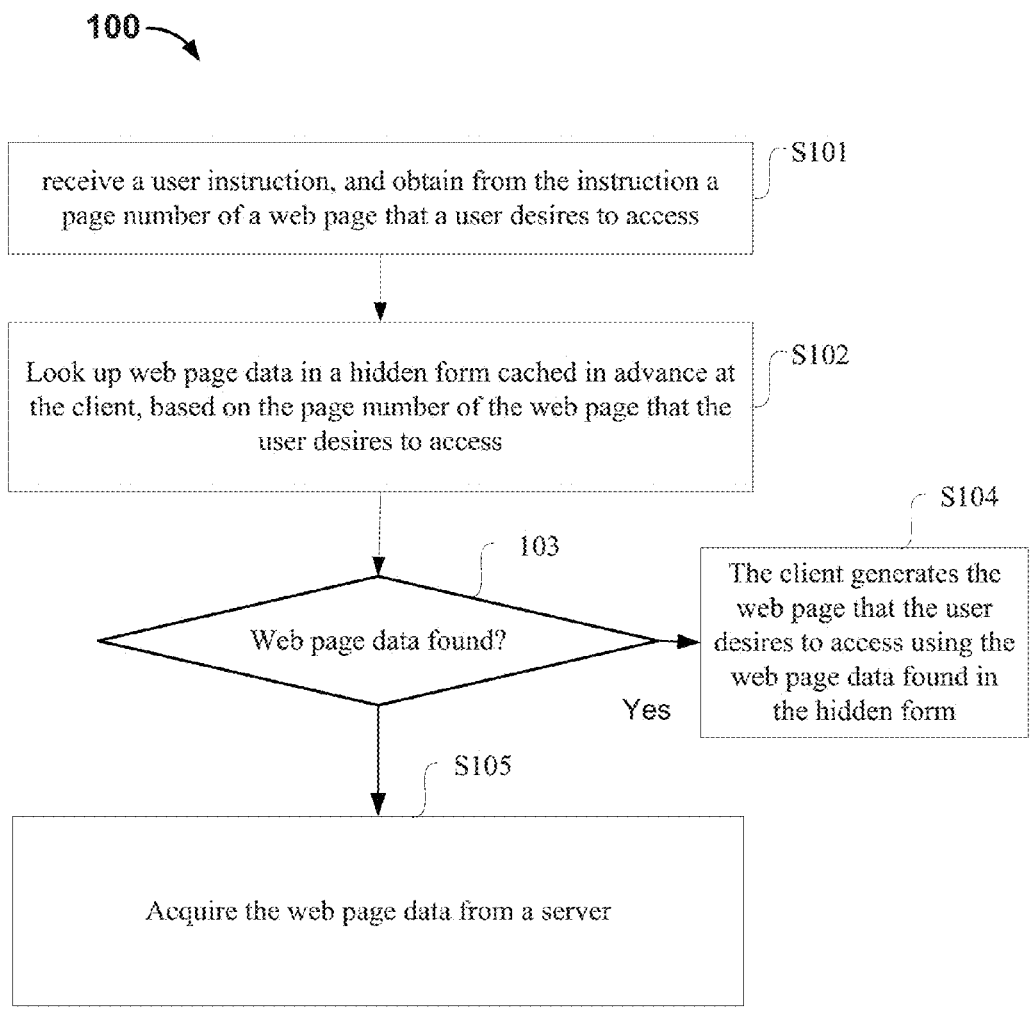
FIG. 1A is a flowchart of a method for acquiring a web page according to an embodiment of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

With a method for acquiring a web page, a client, a server and a network system including the client and the server which are provided in embodiments of the present invention, when a user accesses a web page via the client, the frequency of searching a database by the server to acquire web page data, the IO occupation of the database, the IO bottleneck of the database, the amount of memory occupied in the server, and the pressure on the server are all reduced. Further, the speed of outputting and displaying the web page for the user by the client are improved, thereby improving the user's experience.

In an embodiment of the present invention, a hidden form for web page data is provided at a client and web page data that is within a particular page number range and associated with a web page currently accessed by a user is cached in the hidden form at the client through configurable data cache rules, so that the frequency of searching a database by a server, the IO occupation of the database and the amount of memory occupied in the server are all reduced. The solution provided in the embodiment of the present invention can reduce the pressure on the server significantly.

The hidden form is described now. The hidden form is not displayed in the browser and therefore is invisible to a user of a web page. The hidden form is used to store non-user input data.

In some embodiments, the hidden form includes Hypertext Markup Language (HTML) source code that is generated after the client obtains web page data through the server, by the client according to the web page data and configuration parameters in a configuration file preset by the client.

The hidden form may be represented by a specific HTML form that includes form elements of an invisible type (a hidden type). Therefore, the hidden form does not need to receive any user input data and is used to store some data returned from the server and used for web page submission. When a user switches from the current web page to another web page, the data cached in the hidden form may also be transferred to the other web page from the current web page.

The data cached in the hidden form is stored in form elements of the hidden type in the hidden form part of the source code of an HTML web page currently accessed by the user. For example, in a form element of the hidden type <input type='hidden' name='age' value='12|15|20|17'/> that is used to record a user age, '12|15|20|17' in the value part is the data cached in the hidden form, i.e., the web page data cached at the client.

Technical solutions provided in embodiments of the present invention are described below with reference to the accompany drawings.

FIG. 1A is a flowchart of a method for acquiring a web page according to an embodiment of the present invention. Process 100 may be performed on a client device, using client software such as a web browser that executes on a processor.

At S101, the client receives a user instruction and obtains from the instruction a page number of a web page that a user desires to access.

At S102, based on the page number of the web page that the user desires to access, the client searches a hidden form that is cached in advance at the client for web page data that the user desires to access. The hidden form includes web page data that corresponds to a plurality of page numbers. It is acquired from a server in advance and stored on the client device. In some embodiments, this step includes determining a starting position and an ending position of web page data contained in the web page that the user desires to access within the hidden form, based on the page number of the web page required to be displayed by the user and the preset amount of data contained in each web page. Based on the starting and ending positions, the hidden form is used to find web page data that the user desires to access.

At S103, it is determined whether web page data is found in the hidden form. If web page data is found, at S104, the client generates the web page that the user desires to access using the web page data found in the hidden form. In some embodiments, the webpage is generated by mapping the web page data found in the hidden form to certain preset web page data properties. In the event that the desired web page data is not found in the hidden form cached in advance at the client based on the page number of the web page that the user desires to access, at S105, the client acquires the web page data that the user desires to access from a server.

Figure 1B:
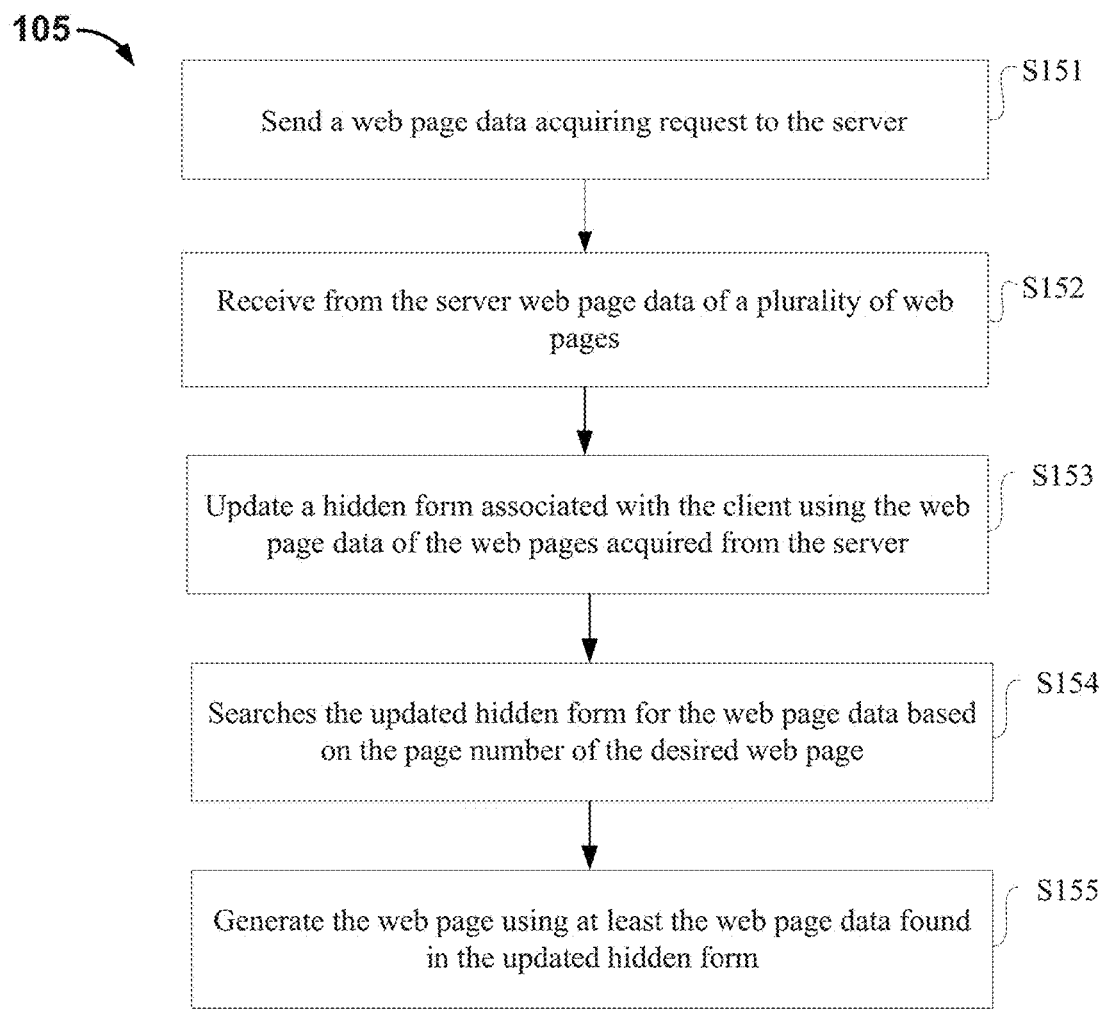
FIG. 1B is a flowchart illustrating an embodiment of a process for acquiring the desired web page data from a server.

FIG. 1B is a flowchart illustrating an embodiment of a process for acquiring the desired web page data from a server. Process 105 in some embodiments corresponds to step S105 of FIG. 1A and is implemented on a client device.

At S151, the client sends to the server a web page data acquiring request, which includes the page number of the web page that the user desires to access, the preset amount of data contained in each web page and the amount of data contained in the hidden form;

At S152, the client receives web page data of a plurality of web pages sent from the server, where the web page data includes the web page data contained in the web page that the user desires to access;

At S153, the client updates its own hidden form using the web page data of the plurality of web pages acquired from the server;

At S154, the client searches the updated hidden form for the web page data that the user desires to access according to the page number of the web page that the user desires to access; and At 155, the client generates the desired web page using at least the web page data found from the updated hidden form.

Figure 2:
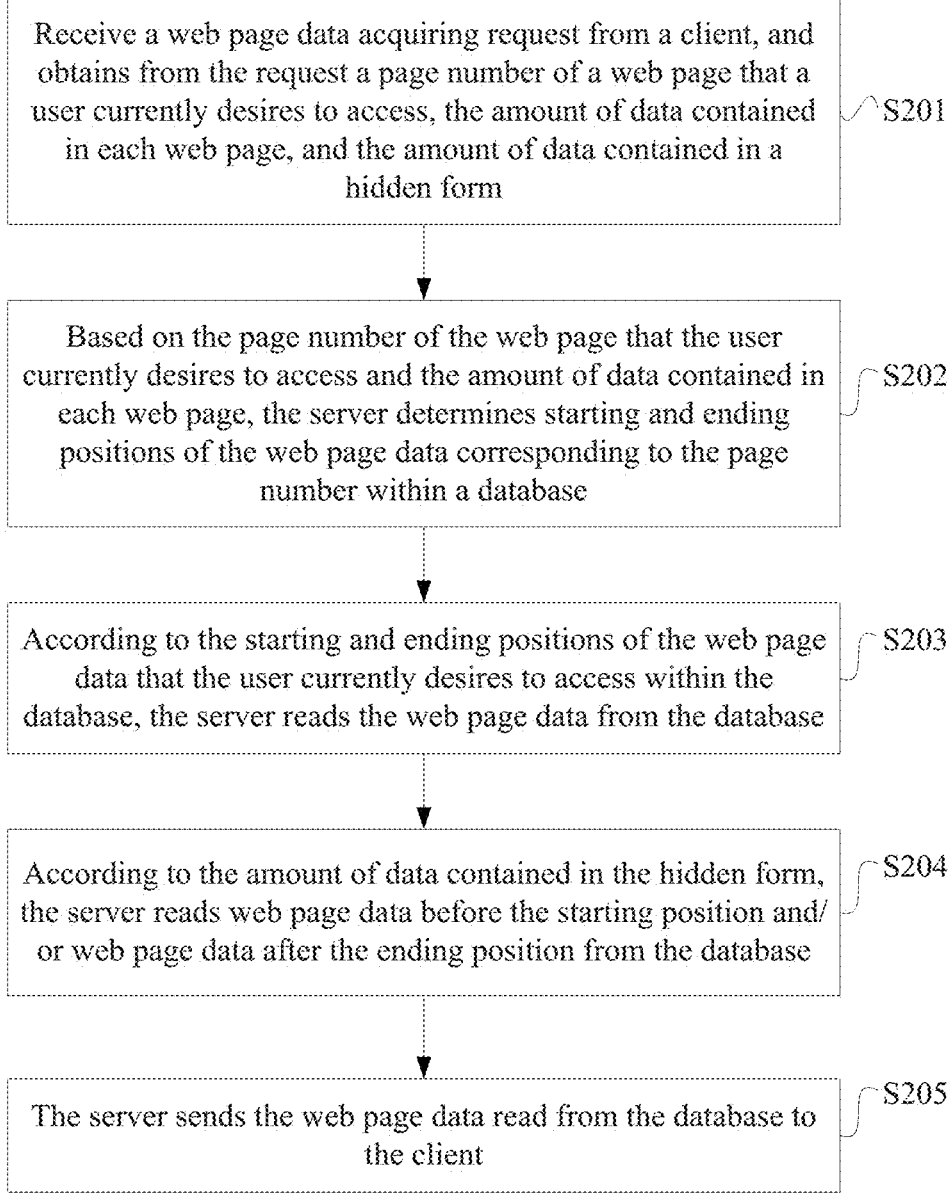
FIG. 2 is a flowchart of a method for sending web page data according to an embodiment of the present invention.

FIG. 2 is a flowchart illustrating an embodiment a method for sending web page data. Process 200 may be performed on a server.

At 201, the server receives a web page data acquiring request from a client and obtains from the request a page number of a web page that a user currently desires to access, the amount of data contained in each web page and the amount of data contained in a hidden form.

At 202, based on the page number of the web page that the user currently desires to access and the amount of data contained in each web page, the server determines a starting position and an ending position of the web page data corresponding to the page number within a database of the server.

At 203, based on the starting and ending positions of the web page data that the user currently desires to access within the database, the server reads the web page data from the database.

At 204, based on the amount of data contained in the hidden form, the server reads web page data before the starting position and/or web page data after the ending position from the database. In some embodiments, the server reads from the database a certain amount of web page data before the starting position and after the ending position and the amount of web page data read before the starting position is equal to that of the web page data read after the ending position.

At 205, the server sends the web page data read from the database to the client.

Thus, the server sends not only the web page data that the user currently desires to access, but also web page data within a certain range that is associated with the web page data that the user currently desires to access to the client for caching.

After acquiring the web page data of a plurality of web pages from the server, the client displays a web page for the user upon a request from the user and shows on the displayed web page not only the page number of the current web page but also page numbers of certain paginated web pages that are associated with the current page number and provided for user selection, as shown in FIG. 3. Page 7 is requested by the user and page numbers of pages 4-6 and 8-10 are also displayed.

As used herein, a cache hit refers to the case where the client finds the web page data that the user desires to access from the hidden form cached at the client. To increase the cache hit ratio of the web page data in the embodiment, only a certain range of page numbers near the page number of the current web page are displayed in the displaying of page numbers of the paginated web pages and other page numbers can be displayed only when a button of "previous page (or previous item)" or "next page (or next item)" is selected, as shown in FIG. 3. The button of "previous page" refers to a link to the previous page and hides when the current page is the first page. The button of "next page" refers to a link to the next page and hides when the current page is the last page.

As shown in FIG. 3, page numbers of 7 paginated web pages, i.e., page numbers 4, 5, 6, 7, 8, 9 and 10, are displayed on a web page and the page number of the currently displayed web page is 7 because that is the page the user has selected to view. In the present embodiment, page numbers of the paginated web pages that are displayed on a web page and provided for user selection are referred to as a page number window, which always displays a certain range of page numbers. This range is referred to as a window size, which is denoted as windowSize in the discussions below.

In this example, the windowSize is set to 7 in a configuration file, that is, page numbers of 7 paginated web pages may be displayed on a web page and 7 page numbers are always displayed unless there are fewer than 7 pages available. When a user pages through the web pages, the page number of the currently displayed web page is always positioned in the middle of the page number window if 7 page numbers are included in the current page number window in the present embodiment, unless no page or an inadequate number of pages exist before or after the currently displayed page. For example, when the current web page is the first or last page, or when only one page number may be displayed before the current page number (e.g., the windowSize is 7 and the current page number is 2), the current page number cannot be displayed in the middle of the page number window.

The purpose of such a page number window with a fixed length is, on the one hand, to make the web page more pleasing and avoid a disordered display of page numbers due to excessive page numbers displayed on the web page; on the other hand, to eliminate the behavior of "jumping to a page" made by the user, to improve the cache hit ratio. For example, if a user accesses a web page with a page number of 7 and subsequently accesses a web page with a page number of 80, which is very far from the web page with the page number of 7, and because the client cannot cache so much data of web pages from page 7 to page 80, the cached hidden form would become invalid too fast to alleviate the pressure on the server.

In some embodiments, a configuration file (for example, with a file name of pagenation.xml) is provided at the client and used for parameter configuration while the client acquires web page data from the server, stores the web page data in the hidden form and generates a web page using the hidden form. The configuration file includes parameters such as the amount of data that the hidden form can store, the amount of data that each web page can display, the value of windowSize, properties of the web page data (i.e., properties of data displayed on a web page, also referred to as mapping fields of the web page data) and a separator between different data objects for each property in the hidden form (which is also referred to as a data separator of a hidden form field).

An example of the configuration file pagenation.xml is shown in Table 1 below.

TABLE 1

```
< pagination id="user">
    <!-- data source (which is classified as a table and an object, where
the table refers to a database table, and the object refers to a JAVA data
object List) -->
    <type> table</type>
    <!-- name of the database or Java data object -->
    <name>user</name>
    <!-- mapping fields -->
    <fields> name, age, sex, country </fields>
    <!-- size of cached data, which is denoted as cacheSize and
preferably set as a multiple of pageSize -->
    <cacheSize>50 </cacheSize>
    <!-- size of data displayed on each page -->
    <pageSize>10 </pageSize>
    <!-- number of displayed page numbers -->
    <windowSize>7</windowSize>
    <!-- a data separator of a hidden form field -->
    <pagenator>|</pagenator>
    </ pagination>
``` where, <pagination id="user"> indicates that a content identifier (i.e., pagination id) of the web page data that a user desires to access is a user; <type>table</type> indicates that the data source of the content is a database of a server; <name>user</name> indicates a name of the database; <fields> name, age, sex, country</fields> indicates that properties of network data acquired from the database are name, age, sex and country; <cacheSize>50</cacheSize> indicates that the number of data items that the hidden form of the client can cache is 50, with each data item (i.e., a data object) comprising a value of each of the properties of name, age, sex and country; <pageSize>10</pageSize> indicates that 10 data items may be displayed on each web page; <windowSize>7</windowSize> indicates that a page number window displayed on each web page includes at most 7 page numbers; and <pagenator>|</pagenator> indicates that the separator between different values of the same property is "|".

In some embodiments, an automatic mapping component for mapping data and form is also provided at the client and is used to translate automatically the data to be cached (i.e., the web page data acquired from the server) into web page (HTML) source code in the hidden form according configuration parameters in the configuration file and insert the source code into the web page, so that the web page to be displayed for the user is obtained.

For example, with the automatic mapping component, four fields of name, age, sex and country (i.e., the properties of the web page data) are obtained from the configuration file and mapped to four sets of data (also referred to as data items, each of which includes data objects of the 4 fields of name, age, sex, and country) obtained from the hidden form, to generate contents to be displayed on a web page, which are shown in Table 2 below. Only 4 data items are shown below for the purpose of illustration.

TABLE 2

| Name | Age | Sex | Country |
|---|---|---|---|
| Jack | 12 | M | UK |
| Kate | 15 | F | USA |
| Jean | 20 | M | France |
| Hans | 17 | M | Germany |

The HTML source code of the hidden form is shown in Table 3 below.

TABLE 3

```
<form name='user' method='post'>
<!-- the cached data follows -->
<input type='hidden' name='name' value='Jack|Kate|Jean|Hans'/>
<input type='hidden' name='age' value='12|15|20|17'/>
<input type='hidden' name='sex' value='M|F|M|M'/>
<input type='hidden' name='country'
value='UK|USA|France|Germany'/>
<!-- the above is the cached data -->
<!-- row number of starting data in the cached data within the database
follows -->
<input type='hidden' name="startNo" value='31'/>
<!-- the above is row number of starting data in the cached data within the
database -->
</form>
``` where <form name='user' method='post'> indicates that a content identifier of the web page data stored in the hidden form is "user".

As shown in table 3, each of the fields is mapped to a hidden form field and both of the fields have the same name. Values (data objects) of the same field at each row of data in Table 3 are separated by the separator configured in the configuration file. For example, data objects of Jack, Kate, Jean and Hans in 'Jack|Kate|Jean|Hans' are separated by the separator "|".

In the example shown, a starting position (also referred to as a starting row number denoted by startNo) of all the web page data acquired from a server within a database of the server is stored in the hidden form. For example, <input type='hidden' name="startNo" value='31'/> in Table 3 indicates that the first set of web page data cached in the hidden form has a row number (startNo) of 31 within the database of the server.

For example, given the fields of name, age, sex and country in the configuration file, by separating 'Jack|Kate|Jean|Hans', '12|15|20|17', 'M|F|M|M' and 'UK|USA|France|Germany' according to the separator "|", respectively, various values of 4 hidden form fields of name[ ], age[ ], sex[ ] and country[ ] may be obtained, thereby obtaining the web page contents to be displayed for the user as shown in Table 2.

In the present embodiment, based on the page number of the web page that the user desires to access, the client determines whether the web page data of the web page is stored in the hidden form. If the web page data of the web page is not stored in the hidden form, that is, there is a cache miss and the cache is invalid, the client would request the server to re-query the database and re-generate the hidden form caching the data. In other words, the hidden form is updated.

For example, if the user clicks on page 7, cacheSize (i.e., total capacity of the cache) is set as 50 and pageSize (i.e., size of data displayed on each web page, that is, the amount of data displayed on each page) is set as 10 in the configuration file for pagination (pagenation.xml) and the starting row number startNo in the hidden form is set as 31, then the ending row number endNo (i.e., the row number of the last set of data cached in the hidden form within the database of the server) may be calculated as endNo=startNo+cacheSize−1=31+50−1=80. In other words, the 31th through 80th entries of web page data in the database of the server are cached in the hidden form.

Based on the fact that the page number of the web page to be displayed is 7 and 10 sets of data are displayed on each web page, the client determines that the 61st to 70th web page data entries are to be displayed. Because the position range of [61, 70] falls within the position range of [31, 80] of the hidden form, there is a cache hit and the client does not need to request the server to query the database and can simply extract the desired data from the respective positions in the hidden form.

If the page number of the web page that the user desires to access is 10, the web page data of the web page refers to the 91st to 100th sets of data in the database of the server, which is beyond the cache range of [31, 80] of the hidden form. In other words, the web page data that the user desires to access is not cached at the client. In this case, the cache range of the hidden form needs to be adjusted and the client re-requests the server to query the database and re-generates the hidden form to cache the data received as the query result.

In some embodiments, the range of the web page data to be displayed is positioned in the middle of the cache range. To this end, when querying the database, according to the page number of the web page requested by the user, the server determines the starting and ending positions of the web page data corresponding to the page number within the database, reads web page data within the range from the starting position to the ending position and also reads (cacheSize−pageSize)/2 sets of web page data before the starting position and (cacheSize−pageSize)/2 sets of web page data after the ending position. In an example where cacheSize and pageSize in the configuration file are 50 and 10, respectively, 20 sets of data are read before the 91st set of web page data and after the 100th sets of web page data, respectively. In other words, the server finds the 71st to 120th sets of web page data from the database and sends the same to the client and the client in turn caches these web page data in the hidden form, thus a new hidden form is generated and the cache range is adjusted to [71, 120].

A device and a system provided in embodiments of the present invention are described below.

As shown in FIG. 4, a client provided in an embodiment of the present invention includes: a hidden form unit 41, adapted to store web page data for a plurality of pages that is acquired from a server 40 into a hidden form; a user instruction unit 42, adapted to receive a user instruction, and obtain from the instruction a page number of a web page that a user desires to access; a web page data searching unit 43, adapted to search the hidden form for web page data according to the page number of the web page that the user desires to access; and a web page generating unit 44, adapted to generate the web page using the web page data found in the hidden form.

In this example, the web page data searching unit 43 includes: a position determining unit 431, adapted to determine the starting and ending positions of web page data contained in the web page that the user desires to access within the hidden form, according to the page number of the web page required to be displayed by the user and the preset amount of data on each web page and a searching unit 432, adapted to search the hidden form for the web page data contained in the web page that the user desires to access, according to the starting and ending positions determined by the position determining unit 431.

In this example, the web page generating unit 44 includes: a setting unit 441, adapted to set and store properties of the web page data and a mapping unit 442, adapted to map the web page data found in the hidden form to the properties of the web page data and generate the web page that the user desires to access.

The client further includes: a requesting unit 45, adapted to send to the server 40 a web page data acquiring request, which includes the page number of the web page that the user desires to access, the preset amount of data contained in each web page and the amount of data contained in the hidden form, when no corresponding web page data is found by the web page data searching unit 43 from the hidden form that is cached in advance at the client; a receiving unit 46, adapted to receive web page data of a plurality of web pages sent by the server 40, where the web page data includes web page data contained in the web page that the user desires to access and an updating unit 47, adapted to update the hidden form using the web page data of the plurality of web pages acquired from the server 40.

The web page data searching unit 43 also searches the updated hidden form for web page data according to the page number of the web page that the user desires to access.

The web page generating unit 44 also generates the web page that the user desires to access using the web page data found in the updated hidden form.

Figure 5:
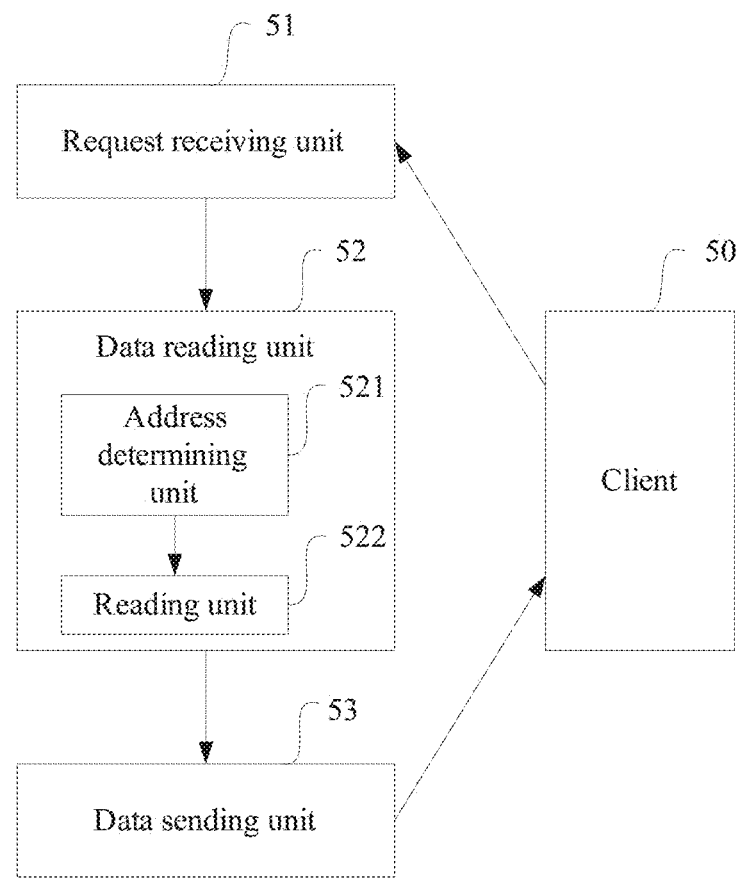
FIG. 5 is a block diagram showing a server system according to an embodiment of the present invention.

As shown in FIG. 5, a server provided in an embodiment of the present invention includes: a request receiving unit 51, adapted to receive a web page data acquiring request sent from a client 50 and obtain from the request a page number of a web page that a user desires to access, the amount of data contained in each web page and the amount of data contained in a hidden form; a data reading unit 52, adapted to determine starting and ending positions of web page data corresponding to the page number of the web page that the user desires to access within a database, according to the page number and the amount of data contained in each web page, read the web page data from the database according to the starting and ending positions and read web page data before the starting position and/or after the ending position from the database according to the amount of data contained in the hidden form and a data sending unit 53, adapted to send to the client 50 the web page data of a plurality of web pages, which are read from the database and include the web page that the user currently desires to access.

In some embodiments, the data reading unit 52 includes: an address determining unit 521, adapted to, according to the page number of the web page that the user desires to access and the amount of data contained in each web page, determine starting and ending positions of web page data corresponding to the page number within the database and a reading unit 522, adapted to read the web page data from the database according to the starting and ending positions and read web page data before the starting position and after the ending position from the database according to the amount of data contained in the hidden form, where the amount of the web page data read before the starting position is equal to the amount of the web page data read after the ending position.

In the examples described above, the units may be implemented as can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as CD-ROM, U disk, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units. Further, the client system and the server system may include communication interfaces that are configured to send and/or receive data. Examples of such communication interfaces include external connections, such as a port, cable, wireline or wireless network interface card, etc., and/or internal connections such as a communication bus, that are configured to send and/or receive data.

Figure 6:
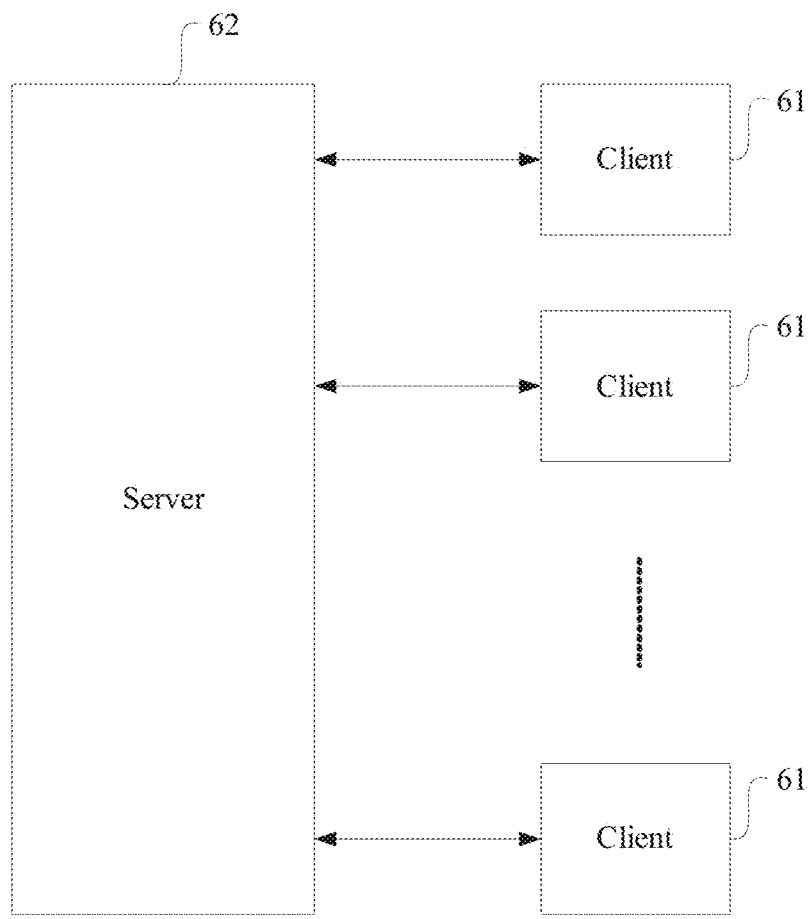
FIG. 6 is a block diagram showing a network system according to an embodiment of the present invention.

As shown in FIG. 6, a network system provided in an embodiment of the present invention includes: a client 61, adapted to acquire web page data of a plurality of web pages from a server 62 and store the acquired web page data in its own hidden form, receive a user instruction and obtain a page number of a web page that a user desires to access from the instruction, search the hidden form for web page data according to the page number and generate the web page using the web page data found in the hidden form and server 62, adapted to receive a web page data acquiring request sent from client 61 and obtain from the request the page number of the web page that the user desires to access, the amount of data contained in each web page and the amount of data contained in the hidden form, determine starting and ending positions of web page data of the web page that the user desires to access within a database according to the page number of the web page that the user desires to access and the amount of data contained in each web page, read the web page data from the database according to the starting and ending positions, read web page data before the starting position and/or after the ending position from the database according to the amount of data contained in the hidden form and send the web page data read from the database to client 61.

As can be seen from the above, with the solution of data caching at the client in the embodiments of the present invention, the frequency of searching a database by a server in the case where a user accesses different web pages is reduced, the IO occupation of the database of the server is reduced and the pressure on the database of the server is alleviated; furthermore, memories occupied in the server is reduced and resources of the server is saved. In addition, the solution of paginating web pages at the client may be customized and configured by the user and therefore is flexible in operation and easy to implement.

It will be appreciated that various alterations and modifications can be made on the present invention by those skilled in the art without departing from the scope of the present invention. Thus, if such alterations and modifications on the present invention fall within the scope of the following claims and equivalents of the present invention, the present invention is intended to encompass such alterations and modifications.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining a page number of a web page a user desires to access;
    determining, using one or more processors, a starting position and an ending position within a database at a server based at least in part on the page number and a preset amount of data each web page is configured to display;
    searching for web page data based at least in part on the starting position and the ending position in a hidden form that is cached in advance at a client, the hidden form comprising data associated with a plurality of page numbers;
    in the event the web page data is not found in the hidden form, acquiring the web page data from the server;
    receiving data acquired from the server;
    updating the hidden form based at least in part on the data acquired from the server;
    searching the updated hidden form for the web page data the user desires to access based at least in part on the starting position and the ending position;
    providing an automatic mapping component for mapping data; and
    generating the web page using at least the automatic mapping component to translate the web page data.

2. The method of claim 1, wherein acquiring the web page data from the server includes:
    sending to the server a web page data acquiring request that includes the page number of the web page that the user desires to access, the preset amount of data that each web page can display, and an amount of data that the hidden form is configured to store; and
    receiving the data acquired from the server, wherein the data acquired from the server corresponds to a plurality of web pages, including the web page data corresponding to the web page that the user desires to access.

3. The method of claim 1, wherein the data acquired from the server includes a first amount of web page data read by the server before the starting position and a second amount of web page data read by the server after the ending position.

4. The method of claim 3, wherein the first amount of web page data read by the server before the starting position is equal to the second amount of web page data read by the server after the ending position.

5. The method of claim 1, further comprising configuring and storing properties of the web page data.

6. The method of claim 1, wherein the page number is included in a displayed set of page numbers.

7. The method of claim 1, wherein the hidden form comprises a specific HTML form including one or more form elements associated with an invisible type.

8. The method of claim 1, wherein the hidden form is configured to store non-user input data.

9. The method of claim 1, further comprising receiving a configuration data including the preset amount of data that each web page is configured to display and an amount of data that the hidden form is configured to store.

10. The method of claim 1, wherein generating the web page using at least the automatic mapping component to translate the web page data comprises to:
    translate the web page data into web page source code; and
    insert the web page source code into the web page.

11. A system, comprising:
    one or more processors configured to:
        obtain a page number of a web page a user desires to access;
        determine a starting position and an ending position within a database at a server based at least in part on the page number and a preset amount of data each web page is configured to display;
        search for web page data based at least in part on the starting position and the ending position in a hidden form that is cached in advance at a client, the hidden form comprising data associated with a plurality of page numbers;
        in the event the web page data is not found in the hidden form, acquire the web page data from the server;
        receive data acquired from the server;
        update the hidden form based at least in part on the data acquired from the server;
        search the updated hidden form for the web page data the user desires to access based at least in part on the starting position and the ending position;
        provide an automatic mapping component for mapping data; and
        generate the web page using at least the automatic mapping component to translate the web page data; and
    one or more memories coupled to the one or more processors and configured to provide the one or more processors with instructions.

12. The system of claim 11, wherein to acquire the web page data from the server includes to:
    send to the server a web page data acquiring request that includes the page number of the web page that the user desires to access, the preset amount of data that each web page can display, and an amount of data that the hidden form is configured to store; and
    receive the data acquired from the server, wherein the data acquired from the server corresponds to a plurality of web pages, including the web page data corresponding to the web page that the user desires to access.

13. The system of claim 11, wherein the data acquired from the server includes a first amount of web page data read by the server before the starting position and a second amount of web page data read by the server after the ending position.

14. The system of claim 13, wherein the first amount of web page data read by the server before the starting position is equal to the second amount of web page data read by the server after the ending position.

15. The system of claim 11, wherein the one or more processors are further configured to configure and store properties of the web page data.

16. The system of claim 11, wherein the page number is included in a displayed set of page numbers.

17. The system of claim 11, wherein the hidden form comprises a specific HTML form including one or more form elements associated with an invisible type.

18. The system of claim 11, wherein the hidden form is configured to store non-user input data.

19. The system of claim 11, wherein the one or more processors are further configured to receive a configuration data including the preset amount of data that each web page is configured to display and an amount of data that the hidden form is configured to store.

20. A computer program product, the computer program product being embodied in a non-transitory computer readable storage medium and comprising computer instructions for:
- obtaining a page number of a web page a user desires to access;
- determining a starting position and an ending position within a database at a server based at least in part on the page number and a preset amount of data each web page is configured to display;
- searching for web page data based at least in part on the starting position and the ending position in a hidden form that is cached in advance at a client, the hidden form comprising data associated with a plurality of page numbers;
- in the event the web page data is not found in the hidden form, acquiring the web page data from the server;
- receiving data acquired from the server;
- updating the hidden form based at least in part on the data acquired from the server;
- searching the updated hidden form for the web page data the user desires to access based at least in part on the starting position and the ending position;
- providing an automatic mapping component for mapping data; and
- generating the web page using at least the automatic mapping component to translate the web page data.

* * * * *